United States Patent
Nonn, Jr. et al.

(10) Patent No.: US 12,450,777 B2
(45) Date of Patent: Oct. 21, 2025

(54) METHODS AND SYSTEMS FOR CALIBRATING AND/OR VERIFYING A CALIBRATION OF AN IMAGING SYSTEM SUCH AS A SURGICAL IMAGING SYSTEM

(71) Applicant: Proprio, Inc., Seattle, WA (US)

(72) Inventors: Thomas Ivan Nonn, Jr., Kenmore, WA (US); Nava Aghdasi, Kirkland, WA (US); James Andrew Youngquist, Seattle, WA (US); Adam Gabriel Jones, Seattle, WA (US)

(73) Assignee: PROPRIO, INC., Seattle, WA (US)

( * ) Notice: Subject to any disclaimer, the term of this patent is extended or adjusted under 35 U.S.C. 154(b) by 69 days.

(21) Appl. No.: 18/327,495

(22) Filed: Jun. 1, 2023

(65) Prior Publication Data
US 2023/0394707 A1    Dec. 7, 2023

Related U.S. Application Data

(60) Provisional application No. 63/347,877, filed on Jun. 1, 2022.

(51) Int. Cl.
*G06T 7/80* (2017.01)
*A61B 90/00* (2016.01)
(Continued)

(52) U.S. Cl.
CPC .............. *G06T 7/80* (2017.01); *A61B 90/361* (2016.02); *G06T 7/20* (2013.01); *G06T 7/50* (2017.01);
(Continued)

(58) Field of Classification Search
CPC .......... G06V 10/761; G06T 2219/2004; G06T 2219/10024; G06T 19/20; G06T 7/20;
(Continued)

(56) References Cited

U.S. PATENT DOCUMENTS

| | | | | |
|---|---|---|---|---|
| 4,439,157 A | * | 3/1984 | Breglia | G02B 27/0172 |
| | | | | 359/618 |
| 6,543,899 B2 | * | 4/2003 | Covannon | G02B 27/017 |
| | | | | 353/11 |

(Continued)

FOREIGN PATENT DOCUMENTS

| | | |
|---|---|---|
| DE | 102010007449 B4 | 2/2013 |
| EP | 2139419 A1 | 1/2010 |

(Continued)

OTHER PUBLICATIONS

International Search Report and Written Opinion for International Application No. PCT/US2023/067764; Date of Mailing: Sep. 28, 2023; 21 pages.

(Continued)

*Primary Examiner* — Michael B. Pierorazio
(74) *Attorney, Agent, or Firm* — Perkins Coie LLP

(57) ABSTRACT

Methods and systems for calibrating an imaging system having a plurality of sensors are disclosed herein. In some embodiments, a method includes initially calibrating the imaging system, operating the imaging system during an imaging procedure, and then updating the calibration during the imaging procedure to account for degradation of the initial calibration due to environmental factors, such as heat. The method of updating the calibration can include capturing image data of a rigid body having a known geometry with the sensors and determining that the calibration has drifted for a problematic one of the sensors based on the captured image data. After determining the problematic one of the sensors, the method can include updating the calibration of the problematic one of the sensors based on the captured image data.

17 Claims, 8 Drawing Sheets

(51) Int. Cl.
*G06T 7/20* (2017.01)
*G06T 7/50* (2017.01)
*G06T 7/60* (2017.01)
*G06T 19/20* (2011.01)
*G06V 10/74* (2022.01)

(52) U.S. Cl.
CPC ............... *G06T 7/60* (2013.01); *G06T 19/20* (2013.01); *G06V 10/761* (2022.01); *G06T 2207/10024* (2013.01); *G06T 2219/2004* (2013.01)

(58) Field of Classification Search
CPC .... G06T 7/50; G06T 7/60; G06T 7/80; A61H 90/361
See application file for complete search history.

(56) References Cited

U.S. PATENT DOCUMENTS

| | | | | |
|---|---|---|---|---|
| 6,652,104 B2* | 11/2003 | Nishida | | H04N 9/3185 353/69 |
| 6,675,040 B1 | 1/2004 | Cosman | | |
| 6,877,863 B2* | 4/2005 | Wood | | H04N 9/3185 353/42 |
| 7,070,283 B2* | 7/2006 | Akutsu | | H04N 5/74 353/30 |
| 7,119,965 B1* | 10/2006 | Rolland | | G02B 27/0172 359/630 |
| 7,182,466 B2* | 2/2007 | Sunaga | | H04N 5/74 353/69 |
| 7,270,421 B2* | 9/2007 | Shinozaki | | G03B 21/142 353/121 |
| 7,359,575 B2* | 4/2008 | Bassi | | G06T 3/18 345/427 |
| 7,441,906 B1* | 10/2008 | Wang | | G03B 21/14 353/121 |
| 7,782,387 B2* | 8/2010 | Azuma | | H04N 25/68 359/662 |
| 8,041,089 B2 | 10/2011 | Drumm et al. | | |
| 8,676,427 B1* | 3/2014 | Ferguson | | G08G 1/0965 701/23 |
| 9,462,164 B2 | 10/2016 | Venkataraman et al. | | |
| 9,734,419 B1 | 8/2017 | Ye et al. | | |
| 9,753,126 B2* | 9/2017 | Smits | | G01S 17/003 |
| 9,810,913 B2* | 11/2017 | Smits | | G02B 5/124 |
| 10,067,230 B2* | 9/2018 | Smits | | G01S 17/86 |
| 10,143,523 B2 | 12/2018 | Mariampillai et al. | | |
| 10,169,665 B1 | 1/2019 | Zhang et al. | | |
| 10,261,183 B2* | 4/2019 | Smits | | G01S 7/4868 |
| 10,379,220 B1* | 8/2019 | Smits | | G01S 7/4811 |
| 10,394,112 B2* | 8/2019 | Johnson | | A01M 1/223 |
| 10,473,921 B2* | 11/2019 | Smits | | G01S 17/87 |
| 10,591,605 B2* | 3/2020 | Smits | | G01S 17/42 |
| 10,650,573 B2 | 5/2020 | Youngquist et al. | | |
| 10,657,664 B2 | 5/2020 | Yu | | |
| 10,663,626 B2* | 5/2020 | Benitez | | G02B 27/01 |
| 10,912,625 B2 | 2/2021 | Browd et al. | | |
| 10,949,986 B1 | 3/2021 | Colmenares et al. | | |
| 11,206,358 B1 | 12/2021 | Tanner et al. | | |
| 11,295,460 B1 | 4/2022 | Aghdasi et al. | | |
| 11,830,455 B2* | 11/2023 | Schriever | | G06F 3/16 |
| 2002/0051095 A1* | 5/2002 | Su | | H04N 9/3194 348/745 |
| 2002/0067466 A1* | 6/2002 | Covannon | | G02B 30/26 353/8 |
| 2002/0122161 A1* | 9/2002 | Nishida | | H04N 9/3194 353/70 |
| 2003/0191836 A1* | 10/2003 | Murtha | | H04L 67/02 709/224 |
| 2003/0210381 A1* | 11/2003 | Itaki | | H04N 5/74 353/70 |
| 2003/0210812 A1 | 11/2003 | Khamene et al. | | |
| 2004/0156024 A1* | 8/2004 | Matsuda | | H04N 9/3185 353/70 |
| 2004/0169673 A1 | 9/2004 | Crampe et al. | | |
| 2005/0046803 A1* | 3/2005 | Akutsu | | H04N 5/74 353/69 |
| 2005/0073661 A1* | 4/2005 | Tamura | | H04N 9/3194 353/70 |
| 2005/0151934 A1* | 7/2005 | Akutsu | | G03B 21/147 353/69 |
| 2005/0237492 A1* | 10/2005 | Shinozaki | | H04N 9/3185 353/69 |
| 2006/0098167 A1* | 5/2006 | Sato | | G03B 21/26 353/35 |
| 2006/0203207 A1* | 9/2006 | Ikeda | | H04N 9/3185 353/70 |
| 2007/0008344 A1* | 1/2007 | Medina | | G06T 15/10 345/647 |
| 2007/0257941 A1* | 11/2007 | Plut | | G06F 9/451 345/660 |
| 2007/0285626 A1* | 12/2007 | Miyasaka | | G03B 21/206 353/85 |
| 2009/0278999 A1* | 11/2009 | Ofune | | H04N 21/47 348/E3.048 |
| 2010/0002123 A1* | 1/2010 | Nozaki | | H04N 23/00 348/E5.022 |
| 2010/0013955 A1 | 1/2010 | Nagasaki | | |
| 2010/0045942 A1* | 2/2010 | Furui | | H04N 9/3194 353/69 |
| 2010/0076306 A1 | 3/2010 | Daigneault et al. | | |
| 2011/0085044 A1* | 4/2011 | Noda | | G03B 21/58 348/E5.133 |
| 2011/0098553 A1 | 4/2011 | Robbins et al. | | |
| 2011/0210979 A1* | 9/2011 | Furui | | G03B 37/04 345/619 |
| 2011/0234994 A1* | 9/2011 | Uchiyama | | H04N 9/3185 353/121 |
| 2011/0285971 A1* | 11/2011 | Oka | | H04N 9/3185 353/70 |
| 2011/0292351 A1* | 12/2011 | Ishii | | H04N 9/3185 353/69 |
| 2013/0245877 A1* | 9/2013 | Ferguson | | G06V 20/56 701/23 |
| 2014/0303827 A1* | 10/2014 | Dolgov | | B60W 30/00 701/23 |
| 2015/0022669 A1 | 1/2015 | Hall | | |
| 2015/0035992 A1 | 2/2015 | Mullis et al. | | |
| 2015/0094897 A1* | 4/2015 | Cuddihy | | B60K 35/81 701/23 |
| 2015/0336502 A1* | 11/2015 | Hillis | | G05D 1/0088 701/23 |
| 2015/0371432 A1 | 12/2015 | Medioni et al. | | |
| 2016/0050357 A1 | 2/2016 | Ijima et al. | | |
| 2016/0234437 A1 | 8/2016 | Kuwada et al. | | |
| 2017/0064210 A1 | 3/2017 | Ohno | | |
| 2017/0166126 A1 | 6/2017 | Sypitkowski | | |
| 2017/0240096 A1* | 8/2017 | Ross | | G05D 1/0212 |
| 2017/0244960 A1 | 8/2017 | Ciurea et al. | | |
| 2017/0264885 A1 | 9/2017 | Haugan et al. | | |
| 2017/0272621 A1 | 9/2017 | Park et al. | | |
| 2017/0295309 A1 | 10/2017 | Cabral et al. | | |
| 2017/0366725 A1 | 12/2017 | Chen et al. | | |
| 2018/0124387 A1 | 5/2018 | Zhao et al. | | |
| 2018/0158102 A1* | 6/2018 | Choi | | G06Q 30/0251 |
| 2018/0286075 A1 | 10/2018 | Jones et al. | | |
| 2018/0348249 A1 | 12/2018 | Kawamoto et al. | | |
| 2019/0129177 A1 | 5/2019 | Roimi et al. | | |
| 2019/0230348 A1 | 7/2019 | Ciurea et al. | | |
| 2019/0295290 A1 | 9/2019 | Schena et al. | | |
| 2020/0005521 A1 | 1/2020 | Youngquist et al. | | |
| 2020/0105065 A1 | 4/2020 | Youngquist et al. | | |
| 2020/0174130 A1* | 6/2020 | Banerjee | | B60R 11/04 |
| 2020/0396363 A1 | 12/2020 | Wang | | |
| 2020/0396365 A1 | 12/2020 | Gunji et al. | | |
| 2021/0004610 A1* | 1/2021 | Huang | | G01S 17/10 |
| 2021/0145254 A1 | 5/2021 | Shekhar et al. | | |
| 2021/0168440 A1* | 6/2021 | Ho | | H04N 21/43632 |
| 2021/0186353 A1 | 6/2021 | Ernst et al. | | |
| 2021/0244485 A1 | 8/2021 | Coiseur et al. | | |
| 2021/0310823 A1* | 10/2021 | Wilbers | | G01C 21/3811 |

(56) References Cited

U.S. PATENT DOCUMENTS

| | | | | |
|---|---|---|---|---|
| 2021/0341310 A1* | 11/2021 | Wilbers | ............... | G01C 21/26 |
| 2022/0014686 A1 | 1/2022 | Lawler et al. | | |
| 2022/0039874 A1* | 2/2022 | Choi | ................ | A61B 6/5223 |
| 2022/0171412 A1* | 6/2022 | Cui | ..................... | G08B 3/10 |
| 2022/0201262 A1* | 6/2022 | Chen | ................ | H04N 9/3185 |
| 2022/0242430 A1* | 8/2022 | Watano | ............. | B60W 50/10 |
| 2023/0010713 A1* | 1/2023 | Park | .................... | G01S 17/88 |
| 2023/0377197 A1* | 11/2023 | Napolskikh | ........... | G01C 11/06 |

FOREIGN PATENT DOCUMENTS

| | | | |
|---|---|---|---|
| WO | 2018164852 | A1 | 9/2018 |
| WO | 2021163406 | A1 | 8/2021 |

OTHER PUBLICATIONS

International Search Report and Written Opinion for International Application No. PCT/US2021/017758; Date of Mailing: Apr. 30, 2021; 25 pages.

Xing et al. A new calibration technique for multi-camera systems of limited overlapping field-of-views. Sep. 28, 2017. [retrieved on Dec. 4, 2021]. retrieved from the internet <URL: https://ieeexplore.ieee.org/document/8206482> pp. 1-8.

* cited by examiner

786

788

METHODS AND SYSTEMS FOR CALIBRATING AND/OR VERIFYING A CALIBRATION OF AN IMAGING SYSTEM SUCH AS A SURGICAL IMAGING SYSTEM

CROSS-REFERENCE TO RELATED APPLICATION

This application claims the benefit of U.S. Provisional Patent Application No. 63/347,877, filed Jun. 1, 2022, and titled "METHODS AND SYSTEMS FOR CALIBRATING AND/OR VERIFYING A CALIBRATION OF AN IMAGING SYSTEM SUCH AS A SURGICAL IMAGING SYSTEM," which is incorporated herein by reference in its entirety.

TECHNICAL FIELD

The present technology generally relates to methods and systems for defining and/or updating an initial calibration—and/or verifying the accuracy of the initial calibration—of an imaging system having multiple cameras or other sensors, such as a surgical imaging system.

BACKGROUND

Multicamera imaging systems are becoming increasingly used to digitize our understanding of the world, such as for measurement, tracking, and/or three-dimensional (3D) reconstruction of a scene. These camera systems must be carefully calibrated and co-calibrated using precision targets to achieve high accuracy and repeatability. Typically, such targets consist of an array of feature points with known locations in the scene that can be precisely identified and consistently enumerated across different camera frames and views. Measuring these known 3D world points and their corresponding two-dimensional (2D) projections in images captured by the cameras allows for intrinsic parameters (e.g., focal length) and extrinsic parameters (e.g., position and orientation in 3D world space) of the cameras to be computed.

The calibration of multicamera imaging systems will typically degrade over time due to environmental factors. The gradual degradation of system performance is often hard to detect during normal operation. As a result, it is typically left to the discretion of the user to periodically check the calibration quality of the system using the calibration target and/or to simply recalibrate the system.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present disclosure.

DETAILED DESCRIPTION

Figure 1:
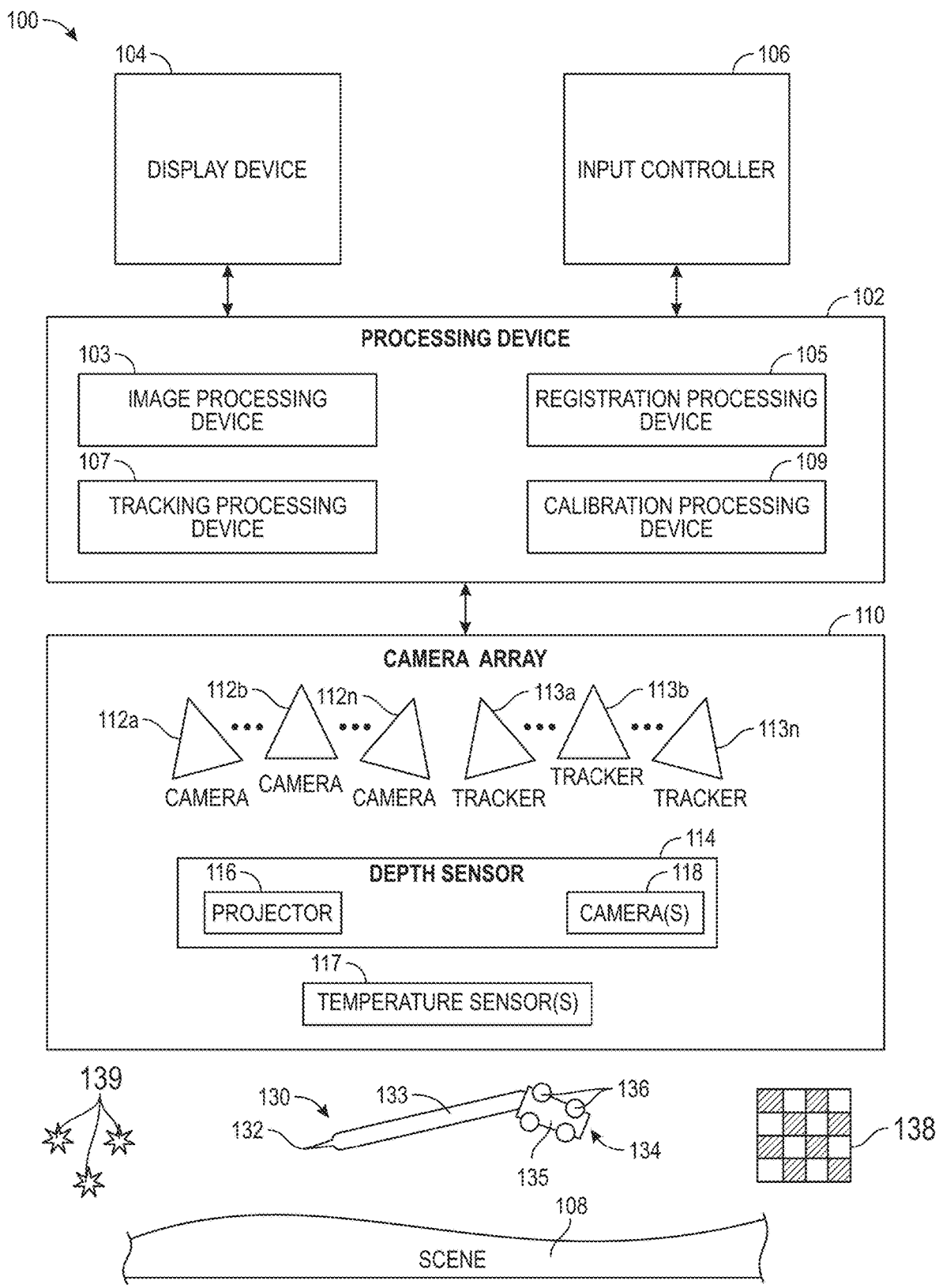
FIG. 1 is a schematic view of an imaging system in accordance with embodiments of the present technology.

Aspects of the present technology are directed generally to methods and systems for defining and/or updating an initial calibration of an imaging system having multiple cameras or other sensors, and/or verifying the accuracy of the initial calibration. In several of the embodiments described below, an imaging system includes one or more cameras, one or more trackers, and/or one or more depth sensors (collectively "sensors") that must be initially calibrated to one another such that data captured by each can be represented in the same reference frame. The continued accuracy of the calibration is dependent on the relative poses (e.g., positions and orientations) of the sensors remaining constant after the calibration. However, when the imaging system is used during an imaging procedure, environmental factors and/or operational byproducts—such as heat—can affect (e.g., warp) the poses of the various sensors, potentially affecting the accuracy of calibration (e.g., causing calibration drift).

Accordingly, in some embodiments a representative method includes initially calibrating the imaging system, operating the imaging system during an imaging procedure, and then updating the calibration during the imaging procedure to account for degradation of the initial calibration due to environmental factors, such as heat. The method of updating the calibration can include capturing image data of a rigid body having a known geometry with the sensors and determining that the calibration has drifted for a problematic one or more of the sensors based on the captured image data. After determining the problematic one or more of the sensors, the method can include updating the calibration of the problematic one or more of the sensors based on the captured image data.

Specific details of several embodiments of the present technology are described herein with reference to FIGS. 1-7C. The present technology, however, can be practiced without some of these specific details. In some instances, well-known structures and techniques often associated with camera arrays, light field cameras, red-green-blue (RGB) cameras, hyperspectral cameras, camera calibration, registration processes, optical tracking, object tracking, marker balls, and the like have not been shown in detail so as not to obscure the present technology.

The terminology used in the description presented below is intended to be interpreted in its broadest reasonable manner, even though it is being used in conjunction with a detailed description of certain specific embodiments of the disclosure. Certain terms can even be emphasized below; however, any terminology intended to be interpreted in any restricted manner will be overtly and specifically defined as such in this Detailed Description section.

The accompanying Figures depict embodiments of the present technology and are not intended to be limiting of its scope. Depicted elements are not necessarily drawn to scale, and various elements can be arbitrarily enlarged to improve legibility. Component details can be abstracted in the figures to exclude details as such details are unnecessary for a complete understanding of how to make and use the present technology. Many of the details, dimensions, angles, and other features shown in the Figures are merely illustrative of particular embodiments of the disclosure. Accordingly, other embodiments can have other dimensions, angles, and features without departing from the spirit or scope of the present technology.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

The headings provided herein are for convenience only and should not be construed as limiting the subject matter disclosed. To the extent any materials incorporated herein by reference conflict with the present disclosure, the present disclosure controls.

I. Selected Embodiments of Imaging Systems

FIG. 1 is a schematic view of an imaging system 100 ("system 100") in accordance with embodiments of the present technology. In some embodiments, the system 100 can be a synthetic augmented reality system, a virtual-reality imaging system, an augmented-reality imaging system, a mediated-reality imaging system, and/or a non-immersive computational imaging system. In the illustrated embodiment, the system 100 includes a processing device 102 that is communicatively coupled to one or more display devices 104, one or more input controllers 106, and a camera array 110. In other embodiments, the system 100 can comprise additional, fewer, or different components. In some embodiments, the system 100 includes some features that are generally similar or identical to those of the mediated-reality imaging systems disclosed in (i) U.S. patent application Ser. No. 16/586,375, titled "CAMERA ARRAY FOR A MEDIATED-REALITY SYSTEM," and filed Sep. 27, 2019 and/or (ii) U.S. patent application Ser. No. 15/930,305, titled "METHODS AND SYSTEMS FOR IMAGING A SCENE, SUCH AS A MEDICAL SCENE, AND TRACKING OBJECTS WITHIN THE SCENE," and filed May 12, 2020, each of which is incorporated herein by reference in its entirety.

In the illustrated embodiment, the camera array 110 includes a plurality of cameras 112 (identified individually as cameras 112a-n; which can also be referred to as first cameras) that can each capture images of a scene 108 (e.g., first image data) from a different perspective. The scene 108 can include for example, a patient undergoing surgery (e.g., spinal surgery) and/or another medical procedure. In other embodiments, the scene 108 can be another type of scene. The camera array 110 can further include dedicated object tracking hardware 113 (e.g., including individually identified trackers 113a-113n) that captures positional data of one more objects—such as an instrument 130 (e.g., a surgical instrument or tool) having a tip 132 and a shaft 133—to track the movement and/or orientation of the objects through/in the scene 108. In some embodiments, the cameras 112 and the trackers 113 are positioned at fixed locations and orientations (e.g., poses) relative to one another. For example, the cameras 112 and the trackers 113 can be structurally secured by/to a mounting structure (e.g., a frame) at predefined fixed locations and orientations. In some embodiments, the cameras 112 are positioned such that neighboring cameras 112 share overlapping views of the scene 108. In general, the position of the cameras 112 can be selected to maximize clear and accurate capture of all or a selected portion of the scene 108. Likewise, the trackers 113 can be positioned such that neighboring trackers 113 share overlapping views of the scene 108. Therefore, all or a subset of the cameras 112 and the trackers 113 can have different extrinsic parameters, such as position and orientation.

In some embodiments, the cameras 112 in the camera array 110 are synchronized to capture images of the scene 108 simultaneously (within a threshold temporal error). In some embodiments, all or a subset of the cameras 112 are light field/plenoptic/RGB cameras that capture information about the light field emanating from the scene 108 (e.g., information about the intensity of light rays in the scene 108 and also information about a direction the light rays are traveling through space). Therefore, in some embodiments the images captured by the cameras 112 encode depth information representing a surface geometry of the scene 108. In some embodiments, the cameras 112 are substantially identical. In other embodiments, the cameras 112 include multiple cameras of different types. For example, different subsets of the cameras 112 can have different intrinsic parameters such as focal length, sensor type, optical components, and the like. The cameras 112 can have charge-coupled device (CCD) and/or complementary metal-oxide semiconductor (CMOS) image sensors and associated optics. Such optics can include a variety of configurations including lensed or bare individual image sensors in combination with larger macro lenses, micro-lens arrays, prisms, and/or negative lenses. For example, the cameras 112 can be separate light field cameras each having their own image sensors and optics. In other embodiments, some or all of the cameras 112 can comprise separate microlenslets (e.g., lenslets, lenses, microlenses) of a microlens array (MLA) that share a common image sensor.

In some embodiments, the trackers 113 are imaging devices, such as infrared (IR) cameras that can capture images of the scene 108 from a different perspective compared to other ones of the trackers 113. Accordingly, the trackers 113 and the cameras 112 can have different spectral sensitives (e.g., infrared vs. visible wavelength). In some embodiments, the trackers 113 capture image data of a plurality of optical markers (e.g., fiducial markers, retroreflective markers, marker balls) in the scene 108. For example, in the illustrated embodiment an optical tracking structure 134 is coupled to the instrument 130. The optical tracking structure 134 can include a constellation or support 135 rigidly attached to shaft 133 of the instrument 130 and a plurality of markers 136 rigidly attached to the support 135 such that the markers 136 are fixed in position relative to the tip 132 and the shaft 133. The markers 136 can be visible to the trackers 113 and/or an auxiliary tracking unit (e.g., positioned external to the camera array 110).

In the illustrated embodiment, the camera array 110 further includes a depth sensor 114. In some embodiments, the depth sensor 114 includes (i) one or more projectors 116 that project a structured light pattern onto/into the scene 108 and (ii) one or more depth cameras 118 (which can also be referred to as second cameras) that capture second image data of the scene 108 including the structured light projected onto the scene 108 by the projector 116. The projector 116 and the depth cameras 118 can operate in the same wavelength and, in some embodiments, can operate in a wavelength different than the cameras 112. For example, the cameras 112 can capture the first image data in the visible spectrum, while the depth cameras 118 capture the second image data in the infrared spectrum. In some embodiments, the depth cameras 118 have a resolution that is less than a resolution of the cameras 112. For example, the depth cameras 118 can have a resolution that is less than 70%, 60%, 50%, 40%, 30%, or 20% of the resolution of the cameras 112. In other embodiments, the depth sensor 114 can include other types of dedicated depth detection hardware (e.g., a LiDAR detector) for determining the surface geometry of the scene 108. In other embodiments, the camera array 110 can omit the projector 116 and/or the depth cameras 118.

In the illustrated embodiment, the processing device 102 includes an image processing device 103 (e.g., an image processor, an image processing module, an image processing unit), a registration processing device 105 (e.g., a registration processor, a registration processing module, a registration processing unit), a tracking processing device 107 (e.g., a tracking processor, a tracking processing module, a tracking processing unit), and a calibration processing device 109 (e.g., a calibration processor, a calibration processing module, a calibration processing unit). The image processing device 103 can (i) receive the first image data captured by the cameras 112 (e.g., light field images, light field image data, RGB images, hyperspectral images) and depth information from the depth sensor 114 (e.g., the second image data captured by the depth cameras 118), and (ii) process the image data and depth information to synthesize (e.g., generate, reconstruct, render) a three-dimensional (3D) output image of the scene 108 corresponding to a virtual camera perspective. The output image can correspond to an approximation of an image of the scene 108 that would be captured by a camera placed at an arbitrary position and orientation corresponding to the virtual camera perspective. In some embodiments, the image processing device 103 can further receive and/or store calibration data for the cameras 112 and/or the depth cameras 118 and synthesize the output image based on the image data, the depth information, and/or the calibration data. More specifically, the depth information and the calibration data can be used/combined with the images from the cameras 112 to synthesize the output image as a 3D (or stereoscopic 2D) rendering of the scene 108 as viewed from the virtual camera perspective. In some embodiments, the image processing device 103 can synthesize the output image using any of the methods disclosed in U.S. patent application Ser. No. 16/457,780, titled "SYNTHESIZING AN IMAGE FROM A VIRTUAL PERSPECTIVE USING PIXELS FROM A PHYSICAL IMAGER ARRAY WEIGHTED BASED ON DEPTH ERROR SENSITIVITY," and filed Jun. 28, 2019, which is incorporated herein by reference in its entirety. In other embodiments, the image processing device 103 can generate the virtual camera perspective based only on the images captured by the cameras 112—without utilizing depth information from the depth sensor 114. For example, the image processing device 103 can generate the virtual camera perspective by interpolating between the different images captured by one or more of the cameras 112.

The image processing device 103 can synthesize the output image from images captured by a subset (e.g., two or more) of the cameras 112 in the camera array 110, and does not necessarily utilize images from all of the cameras 112. For example, for a given virtual camera perspective, the processing device 102 can select a stereoscopic pair of images from two of the cameras 112. In some embodiments, such a stereoscopic pair can be selected to be positioned and oriented to most closely match the virtual camera perspective. In some embodiments, the image processing device 103 (and/or the depth sensor 114) estimates a depth for each surface point of the scene 108 relative to a common origin to generate a point cloud and/or a 3D mesh that represents the surface geometry of the scene 108. Such a representation of the surface geometry can be referred to as a depth map, an N35 surface, a depth surface, and/or the like. In some embodiments, the depth cameras 118 of the depth sensor 114 detect the structured light projected onto the scene 108 by the projector 116 to estimate depth information of the scene 108. In some embodiments, the image processing device 103 estimates depth from multiview image data from the cameras 112 using techniques such as light field correspondence, stereo block matching, photometric symmetry, correspondence, defocus, block matching, texture-assisted block matching, structured light, and the like, with or without utilizing information collected by the depth sensor 114. In other embodiments, depth may be acquired by a specialized set of the cameras 112 performing the aforementioned methods in another wavelength.

In some embodiments, the registration processing device 105 receives and/or stores previously-captured image data, such as image data of a three-dimensional volume of a patient (3D image data). The image data can include, for example, computerized tomography (CT) scan data, magnetic resonance imaging (MRI) scan data, ultrasound images, fluoroscope images, and/or other medical or other image data. The registration processing device 105 can register the preoperative image data to the real-time images captured by the cameras 112 and/or the depth sensor 114 by, for example, determining one or more transforms/transformations/mappings between the two. The processing device 102 (e.g., the image processing device 103) can then apply the one or more transforms to the preoperative image data such that the preoperative image data can be aligned with (e.g., overlaid on) the output image of the scene 108 in real-time or near real time on a frame-by-frame basis, even as the virtual perspective changes. That is, the image processing device 103 can fuse the preoperative image data with the real-time output image of the scene 108 to present a mediated-reality view that enables, for example, a surgeon to simultaneously view a surgical site in the scene 108 and the underlying 3D anatomy of a patient undergoing an operation. In some embodiments, the registration processing device 105 can register the previously-captured image data to the real-time images using any of the methods disclosed in U.S. patent application Ser. No. 17/140,885, titled "METHODS AND SYSTEMS FOR REGISTERING PREOPERATIVE IMAGE DATA TO INTRAOPERATIVE IMAGE DATA OF A SCENE, SUCH AS A SURGICAL SCENE," and filed Jan. 4, 2021, which is incorporated by reference herein in its entirety.

In some embodiments, the tracking processing device 107 processes positional data captured by the trackers 113 to track objects (e.g., the instrument 130) within the vicinity of the scene 108. For example, the tracking processing device 107 can determine the position of the markers 136 in the 2D images captured by two or more of the trackers 113, and can compute the 3D position of the markers 136 via triangulation of the 2D positional data. More specifically, in some embodiments the trackers 113 include dedicated processing hardware for determining positional data from captured images, such as a centroid of the markers 136 in the captured images. The trackers 113 can then transmit the positional data to the tracking processing device 107 for determining the 3D position of the markers 136. In other embodiments, the tracking processing device 107 can receive the raw image data from the trackers 113. In a surgical application, for example, the tracked object can comprise a surgical instrument, an implant, a hand or arm of a physician or assistant, and/or another object having the markers 136 mounted thereto. In some embodiments, the processing device 102 can recognize the tracked object as being separate from the scene 108, and can apply a visual effect to the 3D output image to distinguish the tracked object by, for example, reproducing a 3D visualization (e.g., model) of the object, highlighting the object, labeling the object, and/or applying a transparency to the object.

In some embodiments, the calibration processing device 109 determines an initial calibration of the system 100 that specifies a pose (e.g., a position and orientation; a spatial relationship) for each of the cameras 112, the trackers 113, and the depth sensor 114 in 3D space with respect to a shared origin such that data captured in the different reference frames of the cameras 112, the trackers 113, and the depth sensor 114 can be translated/transformed to another reference frame and represented together. The calibration processing device 109 can further update the calibration to account for degradation (e.g., drift) in the calibration over time due to environmental factors, such as heat, as described in detail below with reference to FIGS. 4-7C. For example, the calibration processing device 109 can update the calibration based on image data received from the cameras 112, the trackers 113, and/or the depth cameras 118 of the markers 136, one or more geometric patterns 138 (e.g., boards), additional markers 139, and/or other known rigid bodies have known geometries in the scene 108. In some embodiments, the additional markers 139 can include features generally similar or identical to any of the markers described in U.S. patent application Ser. No. 16/749,963, titled "ALIGNING PREOPERATIVE SCAN IMAGES TO REAL-TIME OPERATIVE IMAGES FOR A MEDIATED-REALITY VIEW OF A SURGICAL SITE," and filed Jan. 22, 2020, which is incorporated herein by reference in its entirety.

The camera array 110 can include one or more temperature sensors 117 configured to detect and record a temperature profile of the camera array 110. In some embodiments, individual ones of the temperature sensors 117 are associated with each of the cameras 112, the trackers 113, and the depth sensor 114. In some embodiments, calibration updates computed by the calibration processing device 109 can be mapped to the detected temperature profile of the camera array 110 to build a temperature-based library of calibration adjustments, as described in further detail below with reference to FIG. 5.

In some embodiments, functions attributed to the processing device 102, the image processing device 103, the registration processing device 105, the tracking processing device 107, and/or the calibration processing device 109 can be practically implemented by two or more physical devices. For example, in some embodiments a synchronization controller (not shown) controls images displayed by the projector 116 and sends synchronization signals to the cameras 112 to ensure synchronization between the cameras 112 and the projector 116 to enable fast, multi-frame, multicamera structured light scans. Additionally, such a synchronization controller can operate as a parameter server that stores hardware specific configurations such as parameters of the structured light scan, camera settings, and camera calibration data specific to the camera configuration of the camera array 110. The synchronization controller can be implemented in a separate physical device from a display controller that controls the display device 104, or the devices can be integrated together.

The processing device 102 can comprise a processor and a non-transitory computer-readable storage medium that stores instructions that when executed by the processor, carry out the functions attributed to the processing device 102 as described herein. Although not required, aspects and embodiments of the present technology can be described in the general context of computer-executable instructions, such as routines executed by a general-purpose computer, e.g., a server or personal computer. Those skilled in the relevant art will appreciate that the present technology can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The present technology can be embodied in a special purpose computer or data processor that is specifically programmed, configured or constructed to perform one or more of the computer-executable instructions explained in detail below. Indeed, the term "computer" (and like terms), as used generally herein, refers to any of the above devices, as well as any data processor or any device capable of communicating with a network, including consumer electronic goods such as game devices, cameras, or other electronic devices having a processor and other components, e.g., network communication circuitry.

The present technology can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or sub-routines can be located in both local and remote memory storage devices. Aspects of the present technology described below can be stored or distributed on computer-readable media, including magnetic and optically readable and removable computer discs, stored as in chips (e.g., EEPROM or flash memory chips). Alternatively, aspects of the present technology can be distributed electronically over the Internet or over other networks (including wireless networks). Those skilled in the relevant art will recognize that portions of the present technology can reside on a server computer, while corresponding portions reside on a client computer. Data structures and transmission of data particular to aspects of the present technology are also encompassed within the scope of the present technology.

The virtual camera perspective is controlled by an input controller 106 that can update the virtual camera perspective based on user driven changes to the camera's position and rotation. The output images corresponding to the virtual camera perspective can be outputted to the display device 104. In some embodiments, the image processing device 103 can vary the perspective, the depth of field (e.g., aperture), the focus plane, and/or another parameter of the virtual camera (e.g., based on an input from the input controller) to generate different 3D output images without physically moving the camera array 110. The display device 104 can receive output images (e.g., the synthesized 3D rendering of the scene 108) and display the output images for viewing by one or more viewers. In some embodiments, the processing device 102 receives and processes inputs from the input controller 106 and processes the captured images from the camera array 110 to generate output images corresponding to the virtual perspective in substantially real-time or near real-time as perceived by a viewer of the display device 104 (e.g., at least as fast as the frame rate of the camera array 110).

Additionally, the display device 104 can display a graphical representation on/in the image of the virtual perspective of any (i) tracked objects within the scene 108 (e.g., the instrument 130) and/or (ii) registered or unregistered preoperative image data. That is, for example, the system 100 (e.g., via the display device 104) can blend augmented data into the scene 108 by overlaying and aligning information on top of the "passthrough" images of the scene 108 captured by the cameras 112. Moreover, the system 100 can create a mediated-reality experience where the scene 108 is reconstructed using light field image date of the scene 108 captured by the cameras 112, and where instruments are virtually represented in the reconstructed scene via information from the trackers 113. Additionally or alternatively, the system 100 can remove the original scene 108 and completely replace it with a registered and representative arrangement of the preoperatively captured image data, thereby removing information in the scene 108 that is not pertinent to a user's task.

The display device 104 can comprise, for example, a head-mounted display device, a monitor, a computer display, and/or another display device. In some embodiments, the input controller 106 and the display device 104 are integrated into a head-mounted display device and the input controller 106 comprises a motion sensor that detects position and orientation of the head-mounted display device. In some embodiments, the system 100 can further include a separate tracking system (not shown), such an optical tracking system, for tracking the display device 104, the instrument 130, and/or other components within the scene 108. Such a tracking system can detect a position of the head-mounted display device 104 and input the position to the input controller 106. The virtual camera perspective can then be derived to correspond to the position and orientation of the head-mounted display device 104 in the same reference frame and at the calculated depth (e.g., as calculated by the depth sensor 114) such that the virtual perspective corresponds to a perspective that would be seen by a viewer wearing the head-mounted display device 104. Thus, in such embodiments the head-mounted display device 104 can provide a real-time rendering of the scene 108 as it would be seen by an observer without the head-mounted display device 104. Alternatively, the input controller 106 can comprise a user-controlled control device (e.g., a mouse, pointing device, handheld controller, gesture recognition controller) that enables a viewer to manually control the virtual perspective displayed by the display device 104.

Figure 2:
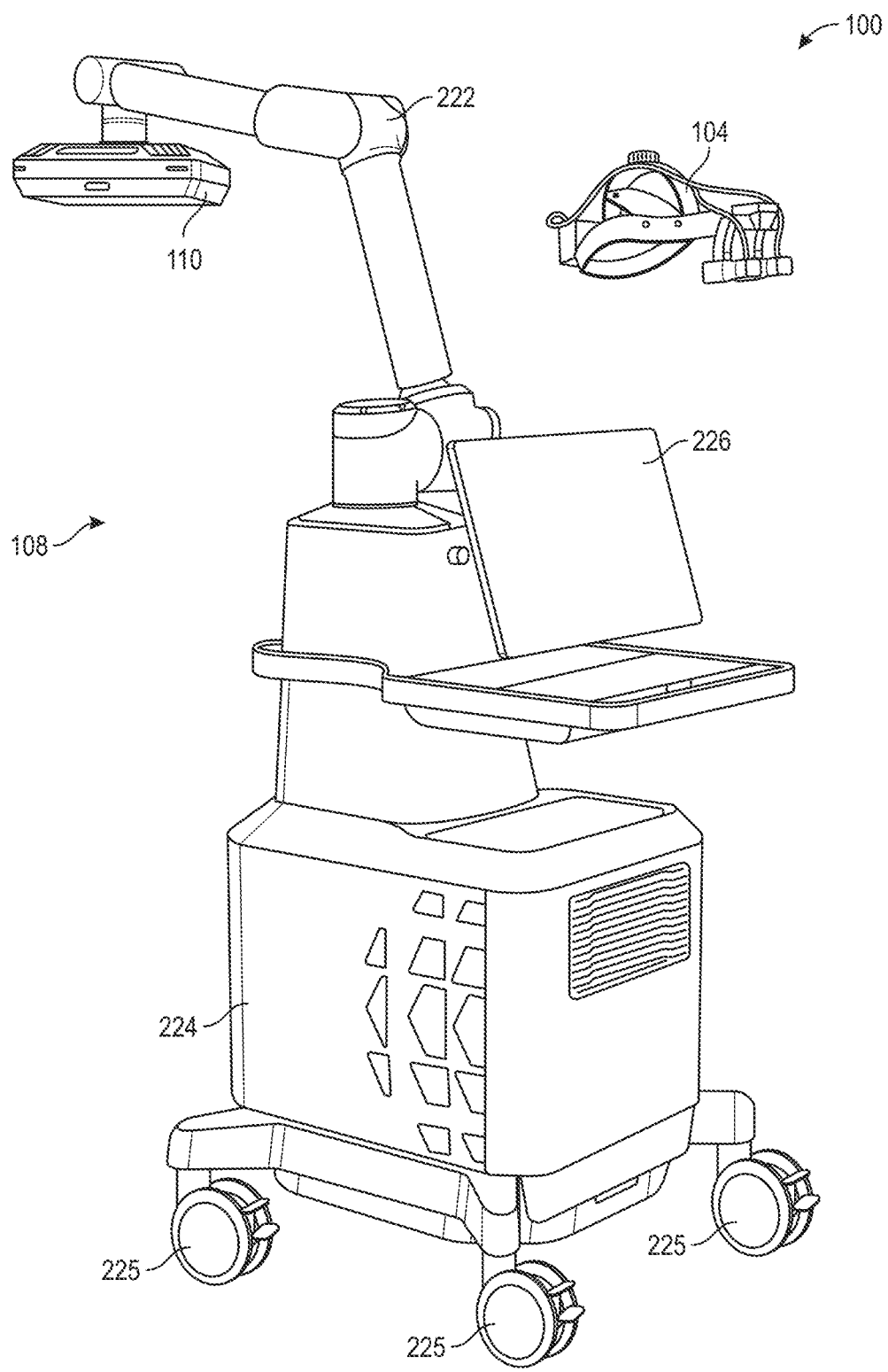
FIG. 2 is a perspective view of a surgical environment employing the imaging system of FIG. 1 for a surgical application in accordance with embodiments of the present technology.

FIG. 2 is a perspective view of a surgical environment employing the system 100 for a surgical application in accordance with embodiments of the present technology. In the illustrated embodiment, the camera array 110 is positioned over the scene 108 (e.g., a surgical site) and supported/positioned via a movable arm 222 that is operably coupled to a workstation 224. In some embodiments, the arm 222 is manually movable to position the camera array 110 while, in other embodiments, the arm 222 is robotically controlled in response to the input controller 106 (FIG. 1) and/or another controller. In the illustrated embodiment, the workstation 224 is mounted on wheels or casters 225 that allow the system 100 to be rolled. In some embodiments, the system 100 can be rolled on the casters 225 and/or the arm 222 can be moved to scan a region of the scene 108, such as a portion of a patient's spine.

In the illustrated embodiment, the display device 104 is a head-mounted display device (e.g., a virtual reality headset, augmented reality headset). The workstation 224 can include a computer to control various functions of the processing device 102, the display device 104, the input controller 106, the camera array 110, and/or other components of the system 100 shown in FIG. 1. Accordingly, in some embodiments the processing device 102 and the input controller 106 are each integrated in the workstation 224. In other embodiments, the processing device 102 and/or the input controller 106 can be integrated into the camera array 110, a separate edge computing device, and/or a cloud computing environment. In some embodiments, the workstation 224 includes a secondary display 226 that can display a user interface for performing various configuration functions, a mirrored image of the display on the display device 104, and/or other useful visual images/indications. In other embodiments, the system 100 can include more or fewer display devices. For example, in addition to the display device 104 and the secondary display 226, the system 100 can include another display (e.g., a medical grade computer monitor) visible to the user wearing the display device 104.

Figure 3:
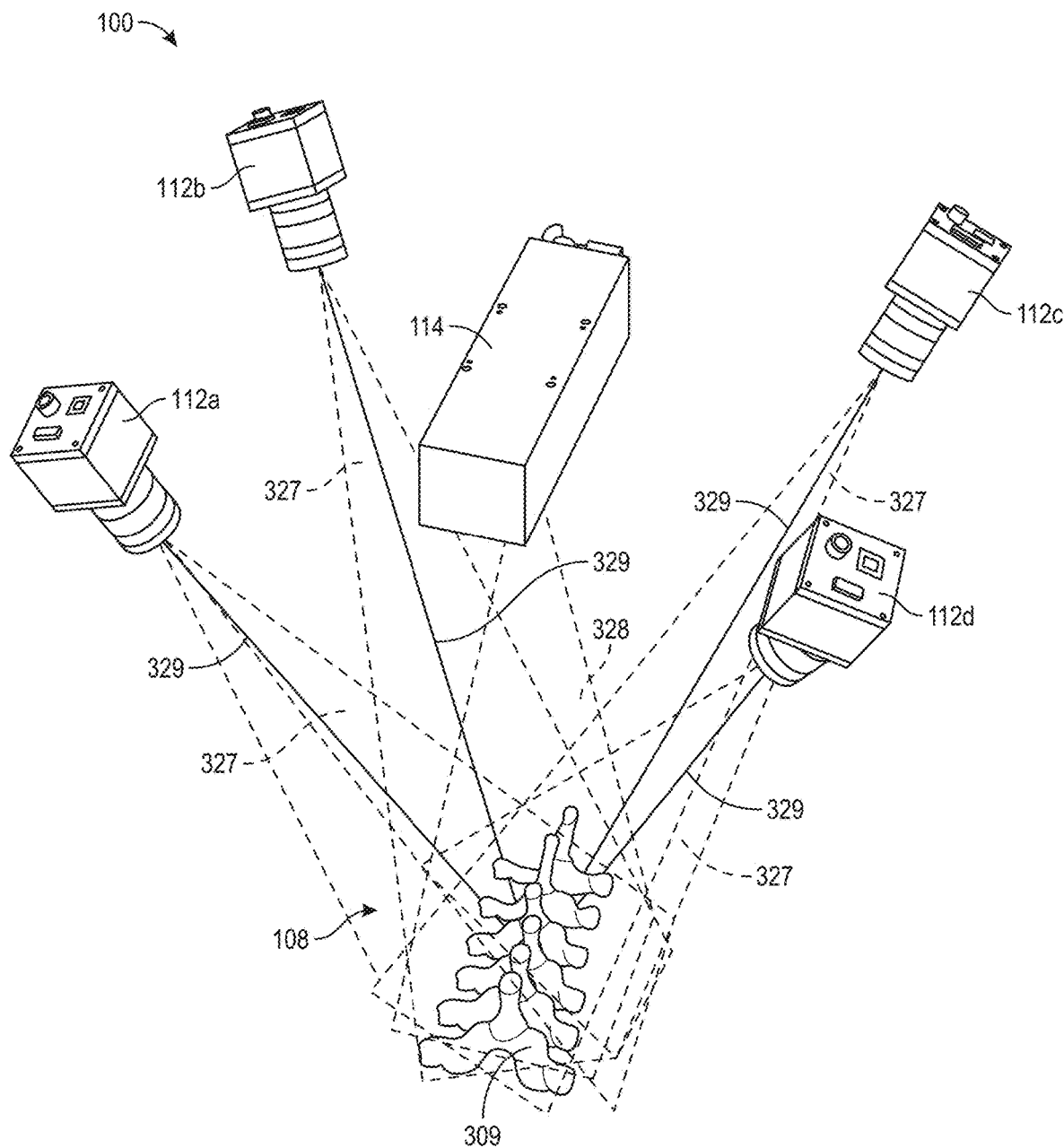
FIG. 3 is an isometric view of a portion of the imaging system of FIG. 1 illustrating four cameras of the imaging system in accordance with embodiments of the present technology.

FIG. 3 is an isometric view of a portion of the system 100 illustrating four of the cameras 112 (identified individually as first through fourth cameras 112a-d, respectively) in accordance with embodiments of the present technology. Other components of the system 100 (e.g., other portions of the camera array 110, the processing device 102, etc.) are not shown in FIG. 3 for the sake of clarity. In the illustrated embodiment, each of the cameras 112 has a field of view 327 and a focal axis 329. Likewise, the depth sensor 114 can have a field of view 328 aligned with a portion of the scene 108. The cameras 112 can be oriented such that the fields of view 327 are aligned with a portion of the scene 108 and at least partially overlap one another to together define an imaging volume. In some embodiments, some or all of the field of views 327, 328 at least partially overlap. For example, in the illustrated embodiment the fields of view 327, 328 converge toward a common measurement volume including a portion of a spine 309 of a patient (e.g., a human patient) located in/at the scene 108. In some embodiments, the cameras 112 are further oriented such that the focal axes 329 converge to a common point in the scene 108. In some aspects of the present technology, the convergence/alignment of the focal axes 329 can generally maximize disparity measurements between the cameras 112. In some embodiments, the cameras 112 and the depth sensor 114 are fixedly positioned relative to one another (e.g., rigidly mounted to a common frame) such that the positions of the cameras 112 and the depth sensor 114 relative to one another is known and/or can be readily determined via a calibration process. In other embodiments, the system 100 can include a different number of the cameras 112 and/or the cameras 112 can be positioned differently relative to another. In some embodiments, the camera array 110 can be moved (e.g., via the arm 222 of FIG. 2) to move the fields of view 327, 328 to, for example, scan the spine 309.

Referring to FIGS. 1-3 together, in some aspects of the present technology the system 100 can generate a digitized view of the scene 108 that provides a user (e.g., a surgeon) with increased "volumetric intelligence" of the scene 108. For example, the digitized scene 108 can be presented to the user from the perspective, orientation, and/or viewpoint of their eyes such that they effectively view the scene 108 as though they were not viewing the digitized image (e.g., as though they were not wearing the head-mounted display 104). However, the digitized scene 108 permits the user to digitally rotate, zoom, crop, or otherwise enhance their view to, for example, facilitate a surgical workflow. Likewise, preoperative image data, such as CT scans, can be registered to and overlaid over the image of the scene 108 to allow a surgeon to view these data sets together. Such a fused view can allow the surgeon to visualize aspects of a surgical site that may be obscured in the physical scene 108—such as regions of bone and/or tissue that have not been surgically exposed.

Figure 4:
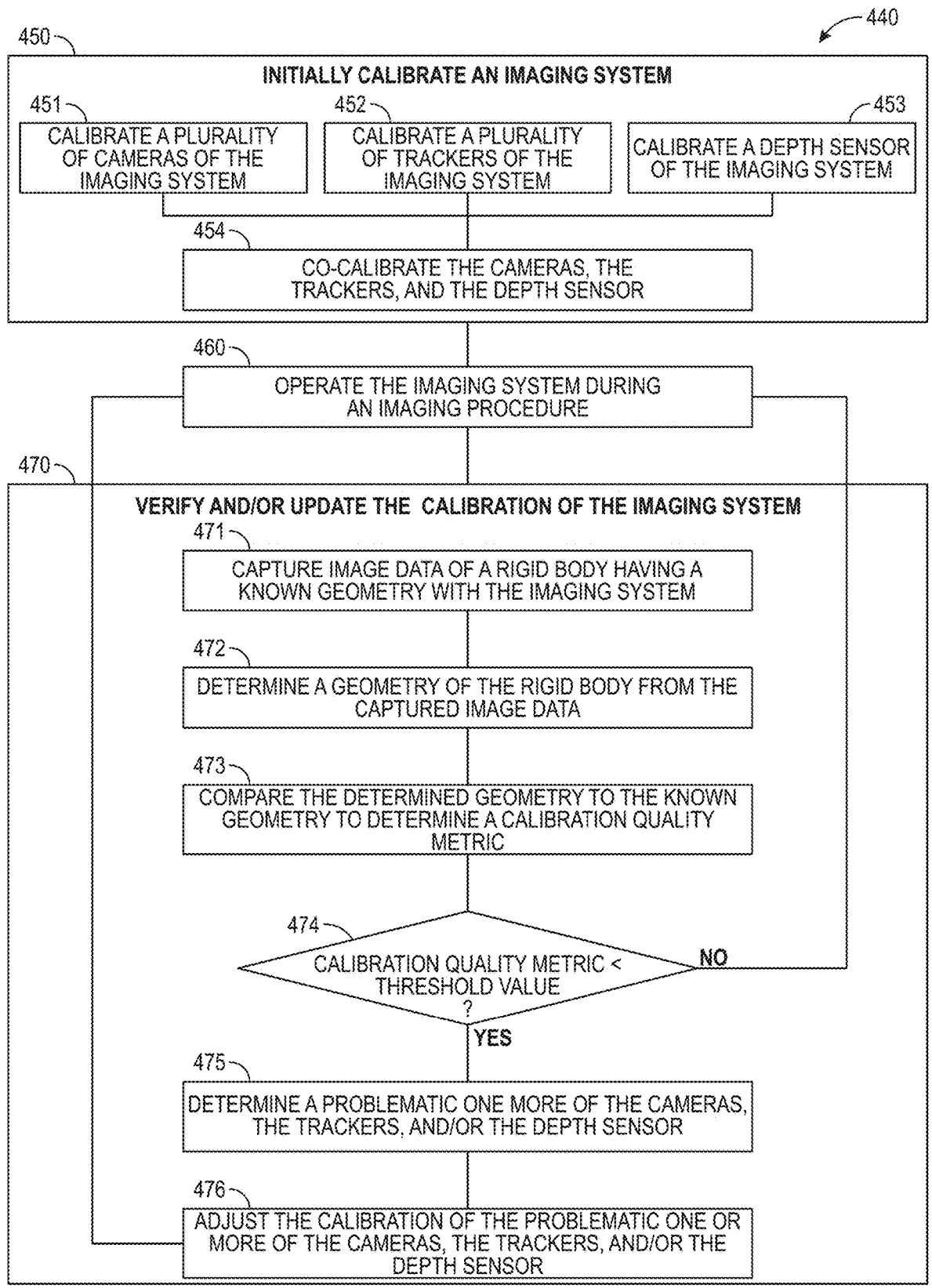
FIG. 4 is a flow diagram of a process or method for updating and/or verifying an initial calibration of the imaging system of FIG. 1 in accordance with embodiments of the present technology.

II. Selected Embodiments of Methods and Systems for Updating a Calibration of an Imaging System FIG. 4 is a flow diagram of a process or method 440 for calibrating the system 100 both initially and during an imaging procedure in accordance with embodiments of the present technology. Although some features of the method 440 are described in the context of the system 100 shown in FIGS. 1-3 for the sake of illustration, one skilled in the art will readily understand that the method 440 can be carried out using other suitable imaging systems including multiple cameras and/or subsets of different types of cameras. For example, the method 440 can be used to calibrate any multi-camera, multi-sensor system, and the system can be used to image a medical scene or any other type of scene.

At block 450, the method 440 can include initially calibrating (e.g., both intrinsically and extrinsically) the system 100 to, for example, determine a pose (e.g., a position and orientation) for each of the cameras 112, the trackers 113, and the depth sensor 114 in three-dimensional (3D) space with respect to a shared origin. In the illustrated embodiment, block 450 includes blocks 451-454.

At block 451, the method 440 can include calibrating (e.g., both intrinsically and extrinsically) the cameras 112 such that, after calibration, image data from each of the spaced apart cameras 112 can be represented in the same reference frame (e.g., with a measured transform between the individual reference frame of each of the cameras 112). In some embodiments, the calibration processing device 109 performs a calibration process to detect the positions and orientation of each of the cameras 112 in 3D space with respect to a shared origin and/or an amount of overlap in their respective fields of view. For example, the calibration processing device 109 can (i) process captured images from each of the cameras 112 including fiducial markers placed in the scene 108 and (ii) perform an optimization over the camera parameters and distortion coefficients to minimize reprojection error for key points (e.g., points corresponding to the fiducial markers). In some embodiments, the calibration processing device 109 performs the calibration process by correlating feature points across different cameras views. The correlated features can be, for example, reflective marker centroids from binary images, scale-invariant feature transforms (SIFT) features from grayscale or color images, and/or the like. In some embodiments, the calibration processing device 109 extracts feature points from a target (e.g., a ChArUco target) imaged by the cameras 112 and processes the feature points with the OpenCV camera calibration routine. In other embodiments, such a calibration can be performed with a Halcon circle target or other custom target with well-defined feature points with known locations. In some embodiments, further calibration refinement can be carried out using bundle analysis and/or other suitable techniques.

At block 452, the method 440 can include calibrating (e.g., both intrinsically and extrinsically) the trackers 113 such that, after calibration, tracking data from each of the spaced apart trackers 113 can be represented in the same reference frame (e.g., with a measured transform between the individual reference frame of each of the trackers 113). The calibration process for the trackers 113 can be generally similar or identical to that of the cameras 112 described in detail above with reference to block 451. For example, the calibration processing device 109 can extract feature points from a target imaged by the trackers 113 and match the feature points across the different views of the trackers 113.

At block 453, the method 440 can include calibrating (e.g., both intrinsically and extrinsically) the depth sensor 114 such that, after calibration, depth data from each of the spaced apart depth cameras 118 can be represented in the same reference frame (e.g., with a measured transform between the individual reference frame of each of the depth cameras 118). The calibration process for the depth cameras 118 can be generally similar or identical to those of the cameras 112 and/or the trackers 113 described in detail above with reference to blocks 451 and 452. For example, the calibration processing device 109 can extract feature points from a target imaged by the depth cameras 118 and match the feature points across the different views of the depth cameras 118.

At block 454, the method 440 can include co-calibrating the cameras 112, the trackers 113, and the depth sensor 114 such that data from each can be represented in a common reference frame (e.g., with a measured transform between the individual reference frames of the cameras 112, the trackers 113, and the depth sensor 114). In some embodiments, the co-calibration is based on imaging of a known target in the scene 108. Where the spectral sensitivities of the cameras 112, the trackers 113, and/or the depth sensor 114 do not overlap, the target can be a multispectral target including, for example, (i) a pattern that is visible to the cameras 112, such as a Halcon circle target pattern, ArUco, ChArUco, or other high contrast color pattern, and (ii) a plurality of optical markers (e.g., retroreflective markers) that are visible to the trackers 113 and the depth sensor 114. The pattern and optical markers of the target can share a common origin and coordinate frame.

In some embodiments, one or more of the blocks 450-454 of the method 440 can include features generally similar to or identical to those of U.S. patent application Ser. No. 15/930,305, titled "METHODS AND SYSTEMS FOR IMAGING A SCENE, SUCH AS A MEDICAL SCENE, AND TRACKING OBJECTS WITHIN THE SCENE," and filed May 12, 2020, which is incorporated herein by reference in its entirety. In some embodiments, some or all of blocks 451-454 can be combined into a single calibration step based on imaging of a common target where, for example, the target is configured (e.g., shaped, sized, precisely manufactured) to allow for calibration points to be uniformly sampled over the desired tracking volume.

After the initial calibration of the imaging system 100, at block 460 the method 440 can include operating the imaging system during an imaging procedure. In some embodiments, the imaging procedure is a surgical procedure, such as a spinal surgical procedure. The imaging procedure can include capturing image data with cameras 112, tracking data with the trackers 113, and/or depth data with the depth sensor 114 and processing the data to, for example, generate a three-dimensional (3D) output image of the scene 108 corresponding to a virtual camera perspective. Sometimes, operation of the system 100 can generate heat, thermal cycling, vibration, and the like that can cause shifts in the positions and/or orientations of one or more of the cameras 112, the trackers 113, and/or the depth sensor 114 relative to the initial calibration (block 450). Such shifts can reduce the accuracy of the known initial calibration (e.g., by introducing calibration drift).

Accordingly, at block 470 the method 450 can include verifying and/or updating the calibration of the system 100 to, for example, account for changes in the initial calibration during operation of the system 100 (block 460). In the illustrated embodiment, block 470 includes blocks 471-475.

At block 471, the method 440 can include capturing image data of a rigid body (which can also be referred to as a geometric structure, a calibration feature, a calibration structure, a calibration geometry, a geometric pattern, and/or the like) having a known geometry with the imaging system 100. In some embodiments, the image data captured by the imaging system 100 includes image data from the cameras 112, image data from the trackers 113, and/or image data from the depth cameras 118 of the depth sensor 114. The rigid body can have a rigid geometry known to the system 100 (e.g., a rigid body definition) and is expected not to deform/degrade during the imaging procedure. For example, the initial calibration (block 450) can include receiving a model (e.g., a 3D model; a CAD model) of the rigid body that fully specifies its geometry.

The rigid body can comprise the markers 136, the geometric pattern 138, a pattern/arrangement of the additional markers 139, and/or another structure having a known geometry that can be positioned in the scene 108 in view of the camera array 110. Accordingly, the rigid body can be positioned on an instrument (e.g., the markers 136 on the instrument 130) or elsewhere in the scene 108 (e.g., the geometric pattern 138) where it is visible to the camera array 110. The rigid body can be continuous (e.g., the constellation of the markers 136) or discrete, such as an arrangement of the additional markers 139 positioned at known distances and orientations relative to one another. In some embodiments, the rigid body is only positioned within the field of view of the camera array 110 temporarily. For example, the markers 136 are only visible when a user is holding the instrument 130 within the field of view of the camera array 110. Likewise, the geometric pattern 138 can be (i) inserted into the field of view of the camera array 110 specifically for updating/verifying the calibration or (ii) printed on or affixed to the workstation 224 or another location that is only visible when the camera array 110 is moved (e.g., via the arm 222) to image the geometric pattern 138 for calibration verification and adjustment. In some embodiments, the rigid body is positioned within the scene 108 to always be visible to the camera array 110 during the imaging procedure.

At block 472, the method 440 can include determining a geometry (e.g., a 3D geometry) of the rigid body from the captured image data. For example, the system 100 (e.g., the calibration processing device 109) can (i) determine the positions of features points of the rigid body in the 2D images captured by any of the cameras 112, the trackers 113, and the depth cameras 118 and (ii) compute the 3D geometry of the rigid body via triangulation of the 2D positional data of the feature points. For example, the feature points can comprise the markers 136, portions of the geometric pattern 138, and/or the additional markers 139.

At block 473, the method 440 can include comparing the determined geometry of the rigid body to the known geometry of the rigid body to determine a calibration quality metric. The calibration quality metric provides an indication of whether the initial calibration is accurate. For example, it is expected that the determined geometry from the captured image data will substantially match the known geometry of the rigid body when the initial calibration remains accurate. Likewise, it is expected that the determined geometry will vary from the known geometry of the rigid body when the initial calibration is no longer accurate (e.g., has drifted) due to, for example, environmental or operational factors like heat.

Accordingly, at decision block 474, the method 440 can include comparing the calibration quality metric to a threshold value. If the calibration quality metric is less than the threshold value—verifying/indicating that the initial calibration remains accurate within a desired margin—the method 440 can return to block 460. If the calibration quality metric is greater than the threshold value—verifying/indicating that the initial calibration has drifted and is no longer accurate within the desired margin—the method 440 can proceed to block 475. In some embodiments, the desired margin (e.g., a separation distance) is less than 0.5 millimeter, less than 0.8 millimeter, less than 1.0 millimeter, less than 2.0 millimeter, or less than 5.0 millimeter.

At block 475, the method 440 can include determining a problematic one or more of the cameras 112, the trackers 113, and/or the depth sensor 114 (a "problematic camera") for which the calibration has drifted from the initial calibration. In some embodiments, the system 100 can determine a geometry of the rigid body (block 472) from image data from multiple subsets of the cameras 112, the trackers 113, and/or the depth sensor 114 and compare the determined geometry of the rigid body across the different subsets to determine the problematic camera. Each subset can include two or more of the cameras 112, the trackers 113, and/or the depth cameras 118 such that the geometry of the rigid body can be triangulated from the 2D images in each subset. More specifically, for example, in the embodiment illustrated in FIG. 3, the geometry of the rigid body can be determined based on 2D images from the following subsets of the cameras 112: (i) the first, second, and third cameras 112a-c, (ii) the first, second, and fourth cameras 112a, b, d, (iii) the first, third, and fourth cameras, 112a, c, d, and (iv) the second, third, and fourth cameras 112b-d. Then, by comparing the geometry of the rigid body determined from the image data from each subset to the known geometry of the rigid body, the problematic camera can be isolated. For example, if the first camera 112a is the problematic camera, it is expected that the geometry determined from the subset (iv) excluding the first camera 112a will more closely match the known geometry than the geometries determined from the subsets (i)-(iii) including the first camera 112a. Thus, by comparing the computed geometries of the rigid body from various subsets of the cameras 112, the trackers 113, and/or the depth sensor 114, the system 100 can identify the problematic camera. In some embodiments, the system 100 can identify that more than one of the cameras 112, the trackers 113, and/or the depth sensor 114 are "problematic."

At block 476, the method 440 can include adjusting the calibration of the problematic one or more of the cameras 112, the trackers 113, and/or the depth sensor 114. For example, the system can generate small changes (e.g., small rotational or translational changes to the initially-determined calibration transformations) that update the initial calibration to reflect the current physical geometry and arrangement of the camera array 110—which may have changed during operation due to heat or other operating conditions. In some embodiments, the calibration adjustments are calculated based on the comparison (block 473) of (i) the geometry of the rigid body determined based on image data received from the problematic camera to (ii) the known geometry of the rigid body.

After block 476, the method 440 can return to block 460 to proceed to verify and/or update the calibration at a later time during the procedure. In some embodiments, the verification/updating of the calibration is continuous or periodic. For example, the system 100 can verify/update the calibration (block 470) continuously if the rigid body is always present in the view of the camera array 100, or at prescribed time intervals (e.g., every 2 minutes, every 5 minutes, every 10 minutes, etc.). In some embodiments, the verification/updating of the calibration is initiated when the rigid body is visible to the camera array 110 (e.g., when the instrument 130 is positioned within the scene 108) and/or manually by a user (e.g., after a surgical procedure or step of a surgical procedure has been completed).

In some embodiments, block 450 can be omitted from the method 440 and block 470 can be used to initially calibrate (e.g., self-calibrate) the system 100. For example, the calibration values used to calculate the calibration quality metrics (block 472) can be initiated as a guess or as previous calibration values rather than a calculated parameter (block 450). That is, the system 100 can be initiated with calibration values that are not based on a determined calibration of the system 100. The system 100 can then iterate through blocks 471-475 to iteratively adjust the calibration for one or more of the cameras 112, the trackers 113, and/or the depth sensor 114 until the calibration is within a determined margin of a desired accuracy.

Figure 5:
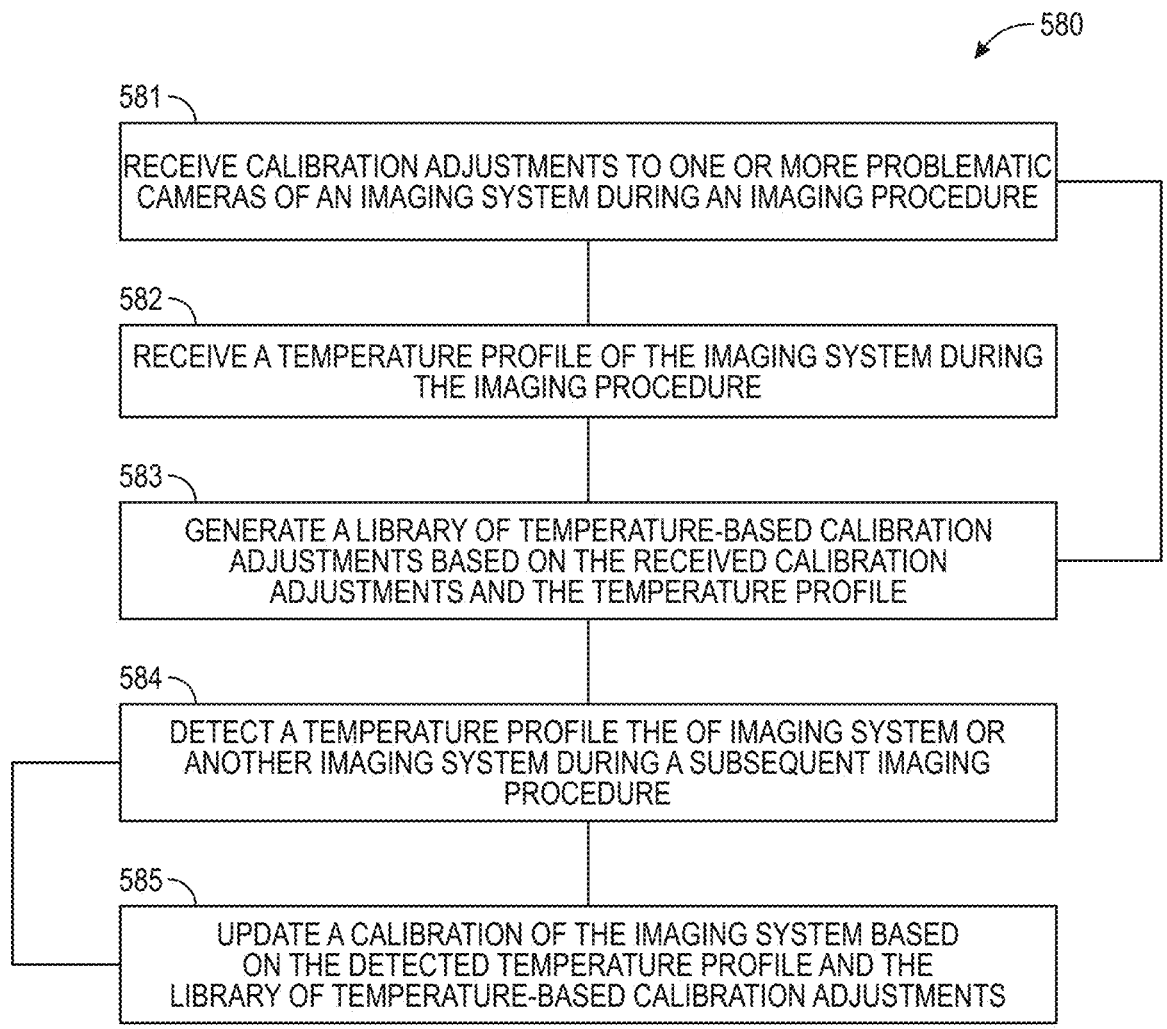
FIG. 5 is a flow diagram of a process or method for updating a calibration of the imaging system of FIG. 1 based on a detected temperature of the imaging system in accordance with embodiments of the present technology.

In some embodiments, the system 100 stores the calibration adjustments generated at block 475 as a function of temperature measured by the temperature sensors 117. Such temperature-based calibration adjustments can be used to update the calibration of the system 100 or similar imaging systems (e.g., identical units) during subsequent imaging procedures. More specifically, for example, FIG. 5 is a flow diagram of a process or method 580 for updating a calibration of the system 100 based on temperature in accordance with embodiments of the present technology. Although some features of the method 580 are described in the context of the system 100 shown in FIGS. 1-3 for the sake of illustration, one skilled in the art will readily understand that the method 580 can be carried out using other suitable imaging systems including multiple cameras and/or subsets of different types of cameras.

At block 581, the method 580 can include receiving calibration adjustments to one or more problematic cameras of the imaging system 100 during an imaging procedure. The calibration adjustments can be generated via the method 440 described in detail above with reference to FIG. 4 (e.g., at block 476).

At block 582, the method 580 can include receiving a temperature profile of the imaging system 100 during the imaging procedure. The system 100 can receive the temperature profile from one or more of the temperature sensors 117. The temperature profile can include information about individual temperature profiles or combined/common temperature profiles of one or more of the cameras 112, the trackers 113, and/or the depth sensor 114.

At block 583, the method 580 can include generating a library of temperature-based calibration adjustments based on the received calibration adjustments and the temperature profile. Specifically, the temperature-based calibration adjustments can map the received calibration adjustments to the temperature of the imaging system 100 (or various subcomponents such as the cameras 112, the trackers 113, the depth sensor 114, etc.) at the time the calibration adjustments are made. In some embodiments, the method 580 can return to block 581 after block 583 to build the library of temperature-based calibration adjustments based on data from, for example, multiple imaging procedures (e.g., for the imaging system 100 and/or another one of the imaging systems 100).

At block 584, the method 580 can include detecting a temperature profile of the imaging system or another imaging system during a subsequent imaging procedure. The other imaging system can be a similar or identical imaging system to that used to generate the library of temperature-based calibration adjustments (blocks 581-583). The system 100 can detect the temperature profile from one or more of the temperature sensors 117.

At block 585, the method 580 can include updating a calibration of the imaging system 100 based on the detected temperature profile and the library of temperature-based calibration adjustments. For example, if the system 100 (e.g., the calibration processing device 109) determines that the temperature profile of the system 100 during the subsequent imaging procedure matches that of a temperature profile in the library, the system 100 can apply the calibration adjustments corresponding to the temperature profile in the library.

Figure 6:
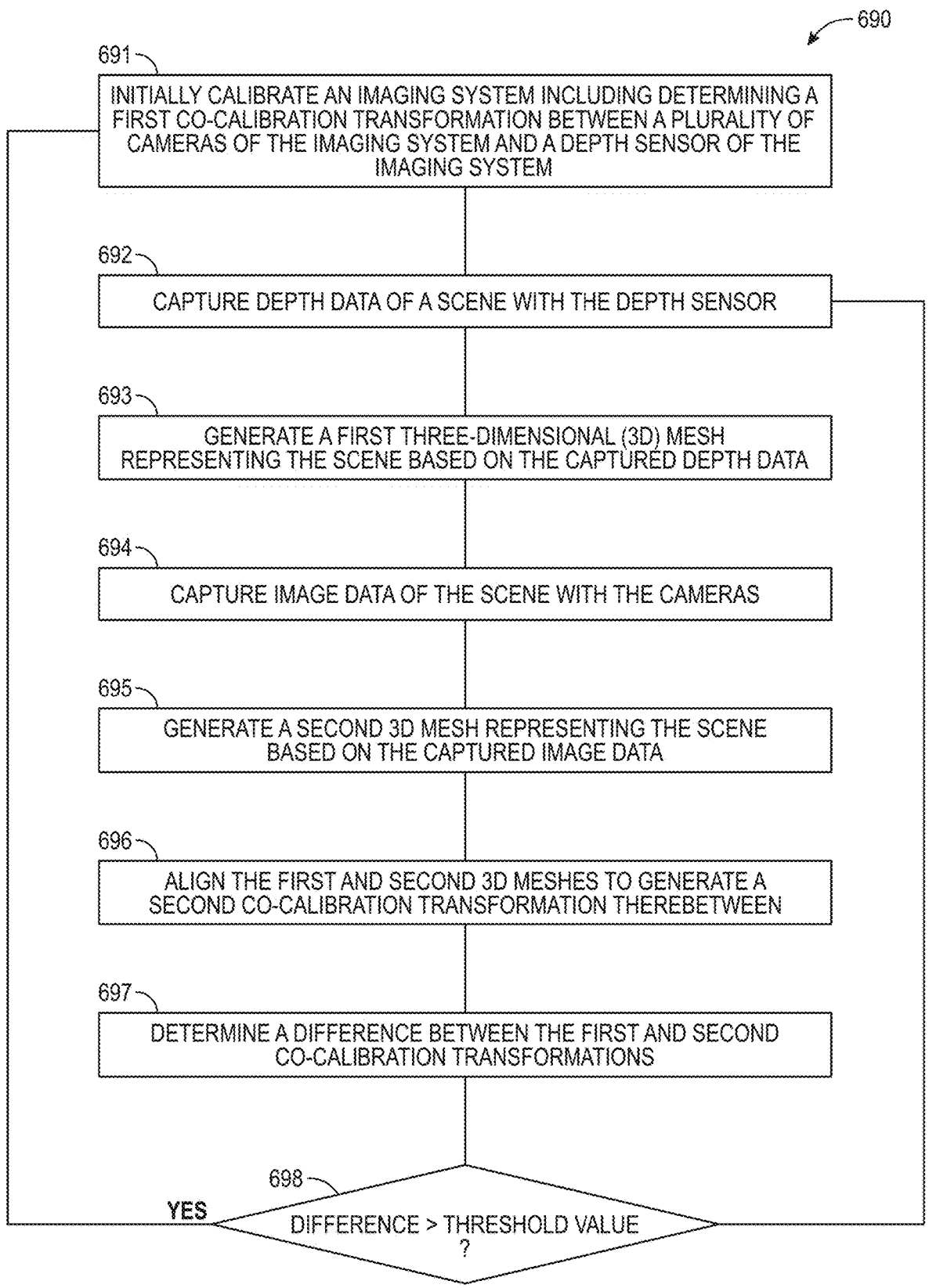
FIG. 6 is a flow diagram of a process or method for assessing a calibration of the imaging system of FIG. 1 in accordance with embodiments of the present technology.

FIG. 6 is a flow diagram of a process or method 690 for verifying and/or updating a co-calibration of the system 100 in accordance with embodiments of the present technology. Although some features of the method 690 are described in the context of the system 100 shown in FIGS. 1-3 for the sake of illustration, one skilled in the art will readily understand that the method 690 can be carried out using other suitable imaging systems including multiple cameras and/or subsets of different types of cameras.

At block 691, the method 690 can include initially calibrating the imaging system 100 as, for example, described in detail above with reference to blocks 450-454 of the method 450 of FIG. 4. The initial calibration includes determining a co-calibration between the cameras 112 and the depth sensor 114 that specifies a first co-calibration transformation therebetween.

At block 692, the method 690 can include capturing depth data of the scene 108 with the depth sensor 114. In some embodiments, the depth data includes stereo images of the scene 108 including depth information from, for example, a pattern projected into/onto the scene by the projector 116.

Figure 7A:
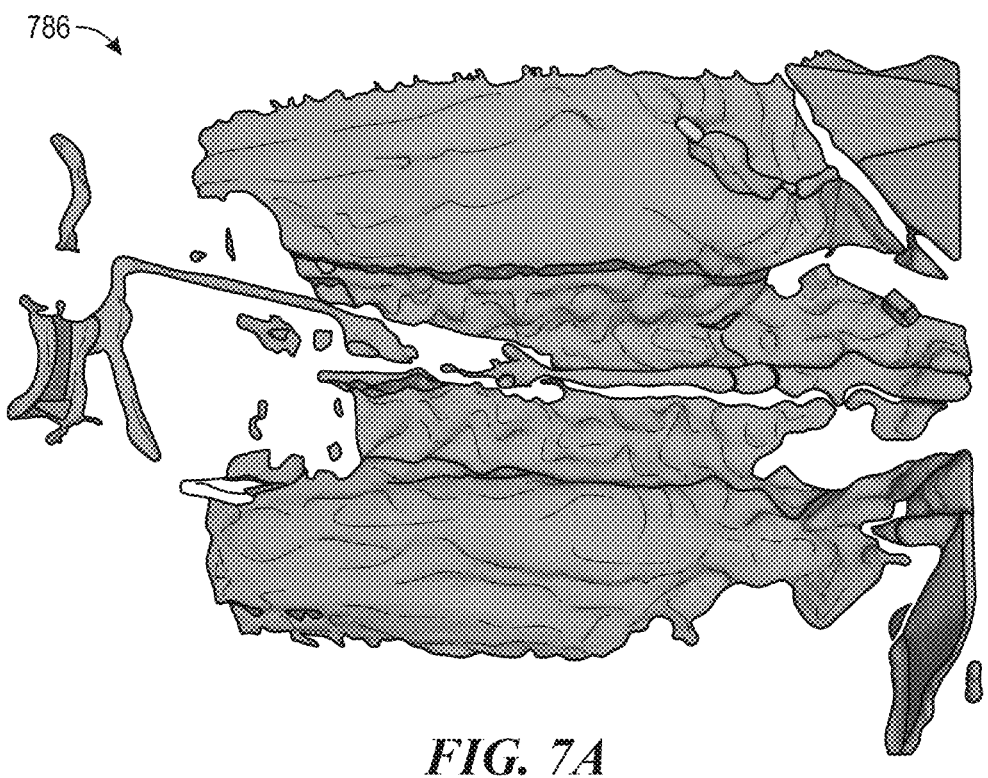
FIG. 7A is a schematic view of a first three-dimensional (3D) mesh of a surgical scene generated from depth data captured by a depth sensor of the imaging system of FIG. 1 in accordance with embodiments of the present technology.

At block 693, the method 690 can include generating a first 3D mesh representing the scene 108 based on the captured depth data. In some embodiments, the processing device 102 (i) processes image data from the depth sensor 114 to estimate a depth for each surface point of the scene 108 relative to a common origin, (ii) generates a point cloud depth map that represents the surface geometry of the scene 108, and then (iii) generates the first 3D mesh from the point cloud depth map. In some embodiments, the system 100 can generate the first 3D mesh using any of the methods disclosed in U.S. patent application Ser. No. 17/140,885, titled "METHODS AND SYSTEMS FOR REGISTERING PREOPERATIVE IMAGE DATA TO INTRAOPERATIVE IMAGE DATA OF A SCENE, SUCH AS A SURGICAL SCENE," and filed Jan. 4, 2021, which is incorporated by reference herein in its entirety. FIG. 7A is a schematic view of a first 3D mesh 786 of a surgical scene (e.g., including a patient undergoing spinal surgery) generated from depth data captured by the depth sensor 114 in accordance with embodiments of the present technology.

At block 694, the method 690 can include capturing image data of the scene 108 with the cameras 112. In some embodiments, the image data is light field image data including encoded depth information about the scene 108.

Figure 7B:
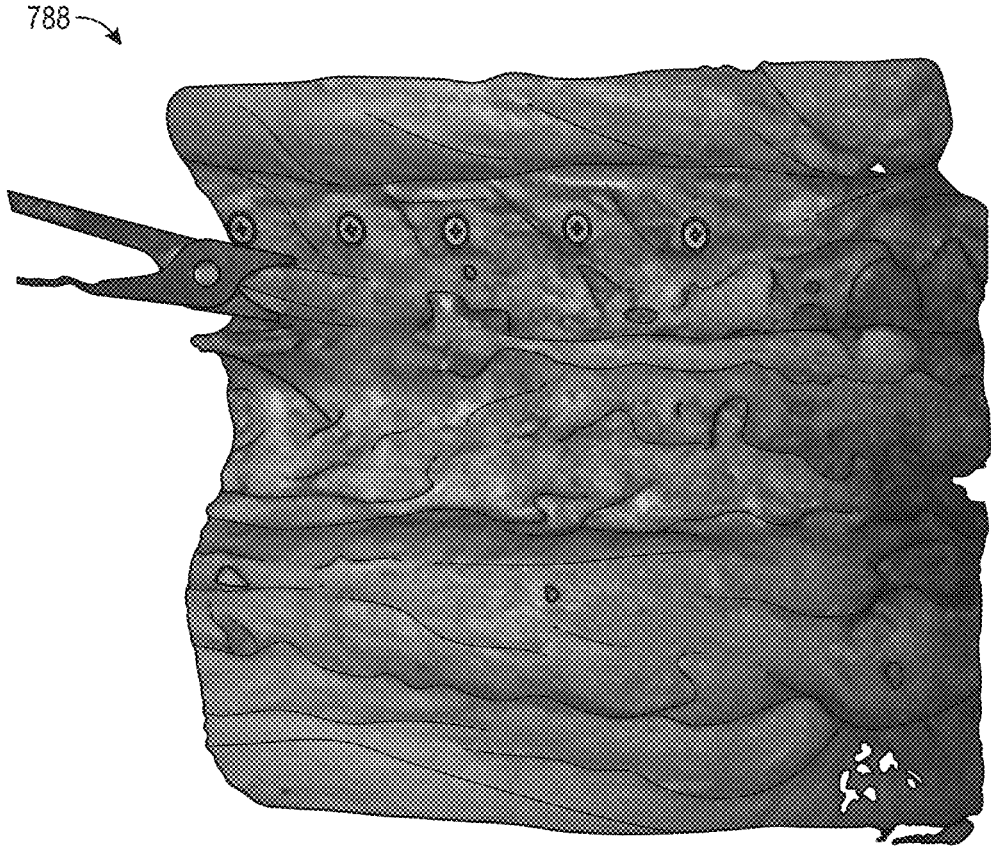
FIG. 7B is a schematic view of a second 3D mesh of the same surgical scene as FIG. 7A and generated from image data captured by a plurality of cameras of the imaging system of FIG. 1 in accordance with embodiments of the present technology.

At block 695, the method 690 can include generating a second 3D mesh representing the scene 108 based on the captured image data. In some embodiments, generating the second 3D mesh includes processing the image data to generate depth data. For example, the image processing device 102 can generate depth data using the disparity from the cameras 112. In some embodiments, other suitable image processing techniques (e.g., computational algorithms) for determining depth from light field data can be used. In some embodiments, the system 100 can generate the second 3D mesh using any of the methods disclosed in U.S. patent application Ser. No. 17/154,670, titled "METHODS AND SYSTEMS FOR AUGMENTING DEPTH DATA FROM A DEPTH SENSOR, SUCH AS WITH DATA FROM A MULTIVIEW CAMERA SYSTEM," and filed Jan. 21, 2021, which is incorporated by reference herein in its entirety. FIG. 7B is a schematic view of a second 3D mesh 788 of the same surgical scene as FIG. 7A and generated from image data captured by the cameras 112 in accordance with embodiments of the present technology.

Figure 7C:
FIG. 7C is a schematic view of the first 3D mesh of FIG. 7A aligned with the second 3D mesh of FIG. 7B in accordance with embodiments of the present technology.

At block 696, the method 690 can include aligning/registering the first and second 3D meshes to generate a second co-calibration transformation therebetween. In some embodiments, the system 100 performs the alignment by detecting positions of fiducial markers and/or feature points visible in both data sets. FIG. 7C is a schematic view of the first 3D mesh 786 of FIG. 7A aligned with the second 3D mesh 788 of FIG. 7B in accordance with embodiments of the present technology.

At block 697, the method 690 can include determining a difference between the first and second co-calibration transformations. It is expected that the second co-calibration transformation between the first and second 3D meshes will be similar or identical to the first co-calibration transformation determined from the initial co-calibration (block 691) if the co-calibration is accurate. Likewise, it is expected that the second co-calibration transformation between the first and second 3D meshes will differ from the first co-calibration transformation determined from the initial co-calibration (block 691) if the co-calibration has drifted and is inaccurate.

At decision block 698, if the difference between the first and second co-calibration transformations is greater than a threshold value—indicating that the co-calibration between the cameras 112 and the depth sensor 114 is not sufficiently accurate—the method 690 can return to block 691 to recalibrate the system 100. In some embodiments, only the co-calibration between the cameras 112 and the depth sensor 114 is updated. If the difference is less than the threshold value—indicating that the co-calibration between the cameras 112 and the depth sensor 114 is sufficiently accurate—the method 690 can end or can return to block 788 to again update and/or verify the accuracy of the co-calibration.

III. Additional Examples

The following examples are illustrative of several embodiments of the present technology:

1. A method of updating a calibration of an imaging system having a plurality of cameras, the method comprising:
   capturing image data of a rigid body having a known geometry with the cameras;
   determining a geometry of the rigid body from the captured image data;
   comparing the determined geometry to the known geometry of the rigid body;
   determining that the calibration has drifted for one or more of the cameras based on the comparison; and
   updating the calibration based on the comparison.
2. The method of example 1 determining that the calibration has drifted for the one or more of the cameras comprises:
   determining a calibration quality metric of the calibration based on the comparison; and
   determining that the calibration quality metric is above a threshold value.
3. The method of example 2 wherein the threshold value is a desired separation distance between the known geometry of the rigid body and the determined geometry of the rigid body.
4. The method of example 3 wherein the desired separation distance is less than 2.0 millimeters.
5. The method of any one of examples 1-3 wherein the cameras comprise at least three different types of cameras, wherein each type of the cameras has different properties.
6. The method of any one of examples 1-5 wherein determining the geometry of the rigid body from the captured image data includes triangulating the geometry of the rigid body from two-dimensional (2D) images in the captured image data.
7. The method of any one of examples 1-6 wherein the rigid body is a rigid constellation of marker balls.
8. The method of example 7 wherein the constellation of marker balls is fixed to a surgical instrument.
9. A method of updating a calibration of an imaging system having a plurality of cameras, the method comprising:
   receiving a first calibration of the imaging system;
   operating the imaging system during an imaging procedure; and
   updating the first calibration of the imaging system to generate a second calibration of the imaging system, wherein updating the first calibration to generate the second calibration comprises:
   capturing image data of a rigid body having a known geometry with the cameras;
   determining a plurality of geometries of the rigid body from the captured image data from individual ones of a plurality of subsets of the cameras;
   comparing the determined geometries to the known geometry of the rigid body;
   determining that the first calibration is incorrect for one or more of the cameras based on at least one of the comparisons; and
   generating the second calibration by adjusting the first calibration based on the at least one of the comparisons.
10. The method of example 9 wherein the imaging procedure is a surgical procedure.

11. The method of example 9 or example 10 wherein the method further comprises operating the imaging system during the imaging procedure using the second calibration.

12. The method of any one of examples 9-11 wherein the method further comprises continuously maintaining the rigid body in a field of view of the imaging system during the imaging procedure.

13. The method of any one of examples 9-11 wherein the method further comprises periodically inserting the rigid body in a field of view of the imaging system during the imaging procedure.

14. The method of any one of examples 9-13 wherein the cameras comprise (a) imaging cameras configured to capture red-green-blue (RGB) image data during the imaging procedure, (b) tracking cameras configured to capture tracking data of an instrument moving through a scene of the surgical procedure during the surgical procedure, and (c) depth cameras configured to capture depth data of the scene of the surgical procedure.

15. A method of continuously or periodically updating a calibration of an imaging system having a plurality of cameras, the method comprising:
receiving a calibration of the imaging system;
operating the imaging system during an imaging procedure; and
during the imaging procedure, continuously or periodically updating the calibration of the imaging system by repeatedly:
 capturing image data of a rigid body having a known geometry with the cameras;
 determining a plurality of geometries of the rigid body from the captured image data from individual ones of a plurality of subsets of the cameras;
 comparing the determined geometries to the known geometry of the rigid body;
 determining that the calibration is incorrect for one or more of the cameras based on at least one of the comparisons; and
 updating the calibration by adjusting the calibration based on the at least one of the comparisons.

16. The method of example 15 wherein the method further comprises continuously maintaining the rigid body in a field of view of the imaging system during the imaging procedure.

17. The method of example 15 wherein the method further comprises periodically inserting the rigid body in a field of view of the imaging system during the imaging procedure.

18. The method of any one of examples 15-17 wherein the imaging procedure is a surgical procedure, and wherein the rigid body is a constellation of marker balls fixed to a surgical instrument for the surgical procedure.

19. The method of any one of examples 15-18 wherein determining that the calibration is incorrect for the one or more of the cameras comprises:
determining a calibration quality metric of the calibration based on the at least one of the comparisons; and
determining that the calibration quality metric is above a threshold value.

20. The method of example 19 wherein the threshold value is a threshold distance of 2.0 millimeters or less.

21. A method for assessing an initial co-calibration between a plurality of cameras and a depth sensor of an imaging system, the method comprising:
capturing depth data of a scene with the depth sensor;
generating a first three-dimensional (3D) mesh representing the scene based on the captured depth data;
capturing image data of the scene with the cameras;
generating a second 3D mesh representing the scene based on the captured image data;
aligning the first and second 3D meshes to generate a co-calibration transformation between the first and second 3D meshes;
determining a difference between the co-calibration transformation and an initial co-calibration transformation determined in the initial co-calibration.

22. A method of updating a calibration of an imaging system having a plurality of cameras, the method comprising:
during operation of one or more imaging systems during corresponding imaging procedures, recording a temperature profile and calibration adjustments of the one or more imaging systems during each of the corresponding imaging procedures;
temporally matching the temperatures profiles to the calibration adjustments to generate a library of temperature-based calibration adjustments; and
during a subsequent target imaging procedure with a target imaging system—
 detecting a temperature profile of the target imaging system; and
 updating a calibration of the target imaging system based on the detected temperature profile and the library of temperature-based calibration adjustments.

23. A method for updating a calibration of an imaging system having a plurality of cameras, the method comprising:
capturing image data of a rigid body having a known geometry with the cameras;
determining that the calibration has drifted for one of the cameras based on the captured image data; and
updating the calibration of the one of the cameras based on the captured image data.

24. The method of example 23 wherein the known rigid body is a rigid constellation of marker balls.

25. The method of example 24 wherein the constellation of marker balls is fixed to a surgical instrument.

26. The method of any one of examples 23-25, wherein the method further comprises:
determining a calibration quality metric of the calibration based on the captured image data; and
determining that the calibration has drifted for the one of the cameras after determining that the calibration quality metric of the calibration is above a threshold value.

27. The method of any one of examples 23-26, wherein determining that the calibration has drifted for the one of the cameras comprises:
determining a geometry of the rigid body from the captured image data; and
comparing the determined geometry to the known geometry of the rigid body.

28. An imaging system, comprising:
a camera array including a plurality of cameras configured to capture image data; and
a processing device communicatively coupled to the camera array, wherein the processing device is configured to perform any one or more of the methods of examples 1-27.

IV. CONCLUSION

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method of updating a calibration of an imaging system having a plurality of cameras, the method comprising:
    capturing image data of a rigid body having a known geometry with the cameras;
    determining a geometry of the rigid body from the captured image data,
    comparing the determined geometry to the known geometry of the rigid body;
    determining that the calibration has drifted for one or more of the cameras based on the comparison, wherein determining that the calibration has drifted comprises:
        determining a calibration quality metric of the calibration based on the comparison; and
        determining that the calibration quality metric is above a threshold value; and
    updating the calibration based on the comparison.

2. The method of claim 1 wherein the threshold value is a desired separation distance between the known geometry of the rigid body and the determined geometry of the rigid body.

3. The method of claim 2 wherein the desired separation distance is less than 2.0 millimeters.

4. The method of claim 1 wherein the cameras comprise at least three different types of cameras, wherein each type of the cameras has different properties.

5. The method of claim 1 wherein determining the geometry of the rigid body from the captured image data includes triangulating the geometry of the rigid body from two-dimensional (2D) images in the captured image data.

6. The method of example claim 1 wherein the rigid body is a rigid constellation of marker balls.

7. The method of claim 6 wherein the constellation of marker balls is fixed to a surgical instrument.

8. A method of updating a calibration of an imaging system having a plurality of cameras, the method comprising:
    receiving a first calibration of the imaging system;
    operating the imaging system during an imaging procedure; and
    updating the first calibration of the imaging system to generate a second calibration of the imaging system, wherein updating the first calibration to generate the second calibration comprises:
        periodically inserting a rigid body having a known geometry in a field of view of the imaging system during the imaging procedure;
        capturing image data of the rigid body with the cameras;
        determining a plurality of geometries of the rigid body from the captured image data from individual ones of a plurality of subsets of the cameras;
        comparing the determined geometries to the known geometry of the rigid body;
        determining that the first calibration is incorrect for one or more of the cameras based on at least one of the comparisons; and
        generating the second calibration by adjusting the first calibration based on the at least one of the comparisons.

9. A method of updating a calibration of an imaging system having a plurality of cameras, the method comprising:
    operating the imaging system during an imaging procedure, wherein the cameras of the imaging system comprise (a) imaging cameras configured to capture red-green-blue (RGB) image data during the imaging procedure, (b) tracking cameras configured to capture tracking data of an instrument moving through a scene of the surgical procedure during the surgical procedure, and (c) depth cameras configured to capture depth data of the scene of the surgical procedure; and
    udating the first calibration of the imaging system to generate a second calibration of the imaging system, wherein updating the first calibration to generate the second calibration comprises:
        capturing image data of a rigid body having a known geometry with at least some of the cameras;
        determining a plurality of geometries of the rigid body from the captured image data from individual ones of a plurality of subsets of the cameras;
        comparing the determined geometries to the known geometry of the rigid body;
        determining that the first calibration is incorrect for one or more of the cameras based on at least one of the comparisons, and
        generating the second calibration by adjusting the first calibration based on the at least one of the comparisons.

10. The method of claim 9 wherein the imaging procedure is a surgical procedure.

11. The method of claim 9 wherein the method further comprises operating the imaging system during the imaging procedure using the second calibration.

12. The method of claim 9 wherein the method further comprises continuously maintaining the rigid body in a field of view of the imaging system during the imaging procedure.

13. A method of continuously or periodically updating a calibration of an imaging system having a plurality of cameras, the method comprising:
   receiving a calibration of the imaging system,
   operating the imaging system during an imaging procedure; and
   during the imaging procedure, continuously or periodically updating the calibration of the imaging system by repeatedly:
      inserting a rigid body having a known geometry in a field of view of the imaging system during the imaging procedure;
      capturing image data of a rigid body with the cameras;
      determining a plurality of geometries of the rigid body from the captured image data from individual ones of a plurality of subsets of the cameras;
      comparing the determined geometries to the known geometry of the rigid body;
      determining that the calibration is incorrect for one or more of the cameras based on at least one of the comparisons; and
      updating the calibration by adjusting the calibration based on the at least one of the comparisons.

14. A method of continuously or periodically updating a calibration of an imaging system having a plurality of cameras, the method comprising:
   receiving a calibration of the imaging sytem;
   operating the imaging system during an imaging procedure; and
   during the imaging procedure, continuously or periodically updating the calibration of the imaging system by repeatedly:
      capturing image data of a rigid body having a known geometry with the cameras;
      determining a plurality of geometries to the rigid body from the captured image data from individual ones of a plurality of subsets of the cameras;
      comparing the determined geometries to the known geometry of the rigid body;
      determining that the calibration is incorrect for one or more of the cameras based on at least one of the comparisons, wherein determining that the calibration is incorrect for the one or more of the cameras comprises:
         determining a calibration quality metric of the calibration based on the at least one of the comparisons; and
         determining that the calibration quality metric is above a threshold value;
   updating the calibration by adjusting the calibration based on the at least one of the comparisons.

15. The method of claim 14 wherein the method further comprises continuously maintaining the rigid body in a field of view of the imaging system during the imaging procedure.

16. The method of claim 14 wherein the imaging procedure is a surgical procedure, and wherein the rigid body is a constellation of marker balls fixed to a surgical instrument for the surgical procedure.

17. The method of claim 14 wherein the threshold value is a threshold distance of 2.0 millimeters or less.

* * * * *